United States Patent [19]
Dupuy

[11] 3,909,350

[45] Sept. 30, 1975

[54] DEVICE FOR HANDLING FUEL ASSEMBLIES WITHIN A NUCLEAR REACTOR CORE

[75] Inventor: Gerard Dupuy, Paris, France

[73] Assignee: Commissariat a l'Energie Atomique, Paris, France

[22] Filed: May 11, 1973

[21] Appl. No.: 359,599

[30] Foreign Application Priority Data
May 18, 1972 France .................. 72.17909

[52] U.S. Cl. .................. 176/30; 214/18 N
[51] Int. Cl. .................. G21c 19/20
[58] Field of Search .................. 176/30–32, 176/87; 214/17, 18 N

[56] References Cited
UNITED STATES PATENTS

| | | | |
|---|---|---|---|
| 3,044,947 | 7/1962 | Payne, Jr. .................. | 176/30 X |
| 3,448,872 | 6/1969 | Oak .................. | 176/30 X |
| 3,713,550 | 1/1973 | Pugh .................. | 176/30 X |

*Primary Examiner*—Samuel W. Engle
*Attorney, Agent, or Firm*—Cameron, Kerkam, Sutton, Stowell & Stowell

[57] ABSTRACT

The device comprises two arms having synchronized movements, the tubular portions of the two arms being rigidly fixed to each other by means of a sliding connection and capable of being endowed by means of a differential drive system with movements for producing the same effort but applied in the opposite direction in order that the lateral reaction on the grab of the first arm on a fuel assembly should be equal and opposite to the lateral reaction of the cylindrical guide tube of the second arm on the same fuel assembly.

4 Claims, 2 Drawing Figures

DEVICE FOR HANDLING FUEL ASSEMBLIES WITHIN A NUCLEAR REACTOR CORE

This invention relates to a handling arm for loading and unloading fuel assemblies within a nuclear reactor, especially a so-called fast reactor in which the core is constituted by a group of fuel assemblies placed in adjacent relation in the vertical position and is surrounded by a reactor containment vault or reactor vessel structure which is usually of concrete and provides suitable protection against radiations. Handling and displacement of spent fuel assemblies within the reactor core for replacement of these latter by fresh fuel assemblies is carried out by means of a handling arm in the form of a right-angled support bracket, the end of which is fitted with a grab or the like. Said handling arm penetrates into the reactor vessel structure through an opening formed in a rotating plug and said plug is in turn mounted in the containment vault roof or top wall of the reactor vessel structure. As a result of the combined movements of rotation which are performed on the one hand by said handling arm within the plug and on the other hand by the plug itself within the top wall of the reactor vessel structure, the grab which is carried by said handling arm can be brought successively into position directly above each core assembly for the withdrawal or replacement of this latter.

The invention is more particularly concerned with devices of the type aforementioned in which the handling arm comprises a tubular portion extending vertically through the rotating plug and provided at the lower end with a horizontal extension or support bracket terminating in a vertical cylindrical sleeve for guiding the grab. Said grab is actuated by a transverse lever which is placed within the support bracket and pivotally mounted on the one hand substantially at the mid-point thereof on a pivot-pin connected to the support bracket and, on the other hand, at one end on the grab body and at the other end on a rod placed in the axis of the tubular portion of the arm. The movements of said rod causes the pivotal motion of the lever and the operation of the grab within its cylindrical guide sleeve in such a manner as to engage or release the head of fuel assembly which is located directly beneath the grab and in the immediate vicinity of this latter as a result of correct positioning of the arm. To this end, the tubular portion of the arm is capable of sliding freely within its rotating plug hole and of permitting either positioning of the cylindrical guide sleeve of the grab above the fuel-assembly head which is to be gripped or lifting said fuel assembly for subsequent withdrawal of this latter from the reactor core after engagement of the grab. The operations described are clearly carried out in the opposite direction for positioning of a fresh fuel assembly to replace a spent assembly which has previously been withdrawn.

In constructional designs of this type, one example of which has been described and illustrated in particular in French Pat. No. 1,569,728 in the name of the present Applicant, a major disadvantage which is inherent in the design concept of a handling arm having an elbowed structure arises from the lateral reaction exerted by the grab on the fuel-assembly head when an upward tractive force is applied to this latter. In some cases, this defect in design is liable to result in jamming of the fuel assembly especially if this latter exhibits either swelling or excessive curvature as a result of irradiation and deformations after a certain time of operation within the reactor core.

The device which is contemplated in the present invention for handling fuel assemblies in a nuclear reactor overcomes the disadvantage mentioned in the foregoing, especially insofar as any lateral reaction on the head of any fuel assembly diring a handling operation is automatically eliminated so that the resultant of the forces applied always remains vertical or in other words in the direction of the tractive force which is applied to said fuel assembly.

To this end, the device under consideration essentially comprises two arms having synchronized movements, the first arm being constituted by a vertical tubular portion, a right-angled horizontal support bracket fixed at the end of the tubular portion which penetrates into the reactor vessel structure and a vertical sleeve for guiding a handling grab which is provided at the opposite end of the support bracket with respect to the first arm, the second arm being provided with a vertical tubular portion, a right-angled horizontal support bracket disposed in the vertical plane containing the support bracket of the first arm and a vertical cylindrical guide tube which is coaxial with the guide sleeve of said grab, the tubular portions of the two arms being rigidly fixed to each other by means of a sliding coupling and endowed by means of a differential drive system with movements for producing the same effort but applied in the opposite direction in order that the lateral reaction of the grab of the first arm on a fuel assembly should be equal and opposite to the lateral reaction of the cylindrical guide tube of the second arm on the same fuel assembly.

As a preferable feature, the sliding coupling between the vertical tubular portion of the two arms is constituted by a transverse stirrup-piece which is rigidly fixed to one of the arms and carries rollers freely mounted on horizontal pins and applied against the surface of the other arm.

In accordance with a particular feature of the device considered, the differential system for actuating the two arms comprises a common driving motor for a driving ring-gear which carries two planetary pinions disposed in meshing engagement with two sun-gears rigidly fixed to two driven output shafts which are disposed in the line of extension of each other and provided with two elements for direct motion transmission to the vertical tubular portions of the two arms. Advantageously, the output shafts of the two sun-gears are each associated with a brake which permits independent operation of either one arm or the other.

In accordance with requirements, the elements for driving the tubular portions of the two arms are constituted by pinions engaged with racks carried by said tubular portions or by sprockets actuating chains which are connected to said tubular portions at the upper ends thereof.

Further characteristic features of a handling device as constructed in accordance with the invention will become apparent from the following description of one exemplified embodiment which is given by way of indication without implying any limitation of the invention, reference being made to the accompanying drawings, wherein.

Figure 1:
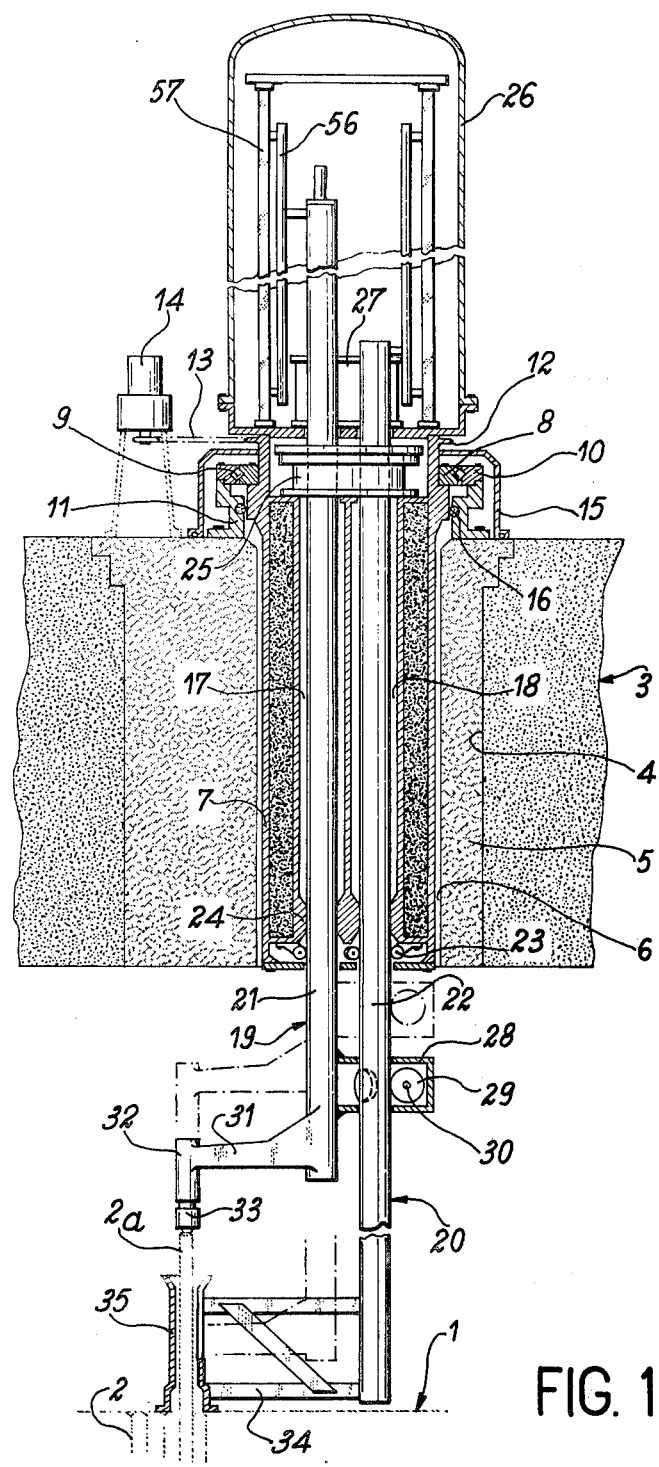
FIG. 1 is a diagrammatic longitudinal sectional view of the device under consideration.

In FIG. 1, the reference numeral 1 designates the upper portion of the core of a nuclear reactor and especially a fast reactor. Said core is formed by stacking prismatic fuel assemblies 2 in adjacent relation as represented schematically in the figure since the constructional detail of said assemblies has no direct bearing on the invention. One of the above-mentioned fuel assemblies 2a is shown in FIG. 1 during handling by means of the device according to the invention. The reactor core 1 is surrounded in a conventional manner by a containment vault or reactor vessel structure 3 formed of concrete in particular and provided with a hole 4 which is set slightly off-center with respect to the reactor core 1 and in which is mounted a rotating plug 5. Said plug is in turn provided with an eccentric through-hole 6 in which is placed a block 7 for supporting the complete handling device. There is formed at the top portion of said block 7 a transverse shoulder 8 which is capable of rotating within supporting ring 10 on bearings such as 9. The supporting ring 10 rests on a base 11 which bears on the top portion of the rotating plug 5. Driving of the block 7 about its axis within the hole 6 of the plug is carried out by means of a sprocket-drive ring gear 12 engaged with a driving chain 13 which is displaced in rotational motion by means of a reduction-gear motor set 14 mounted externally of the reactor and supported by the top face of the plug. The shouldered portion 8 and the supporting ring 10 of the block 7 are placed within a stationary shield casing 15, pressure-tightness with respect to the interior of the reactor vessel 3 at the point of penetration through the hole 6 being ensuring by means of friction seals 16 of known type.

In accordance with the invention, The block 7 has two vertical holes 17 and 18 respectively, in which two parallel arms 19 and 20 are intended to be mounted. Each arm has a vertical tubular portion 21 and 22 which extends through said holes 17 and 18 and is guided in axial motion by means of rollers 23. Moreover, the holes 17 and 18 are provided at the lower ends with projecting bosses such as the boss 24 which are intended to be applied against the external surfaces of the tubular portions 21 and 22 in order to ensure leak-tightness in relative sliding motion with respect to the block 7. At the opposite end, the tubular portions 21 and 22 pass through a second sealing assembly 25, the constructional design of which is of no interest in this description. Said tubular portions extend to the exterior of the pressure vessel structure 3 into a hood 26 containin a differential drive system 27 which will be discussed in detail hereinafter with reference to FIG. 2.

In accordance with one important arrangement of the invention, the two tubular portions 21 and 22 of the two handling arms are rigidly fixed to each other by means of a sliding system which prevents any relative lateral displacements but does not prevent independent displacements of said arms in the vertical direction. This sliding system essentially comprises a transverse stirrup-piece 28 which is rigidly fixed, for example, to the external surface of the tubular portion 21 of the first arm 19. Said stirrup-piece supports guiding rollers such as the roller 29 which are mounted to rotate freely within said stirrup-piece about horizontal pins 30 and are applied against the external surface of the second tubular element 22.

The tubular portion 21 of the first arm 19 is provided at the lower end thereof with a right-angled horizontal extension forming a support bracket 31 which terminates in a cylindrical sleeve 32 having a vertical axis. Said sleeve contains a grab 33 which is capable of engaging the head of the fuel assembly 2a to be handled. Similarly, the tubular element 22 of the second arm 20 is provided with a horizontal support bracket 34 located in the same vertical plane as the support bracket 31 and terminating in a cylindrical guide tube 35 which is disposed coaxially with and beneath the sleeve 32 of the grab 33.

Figure 2:
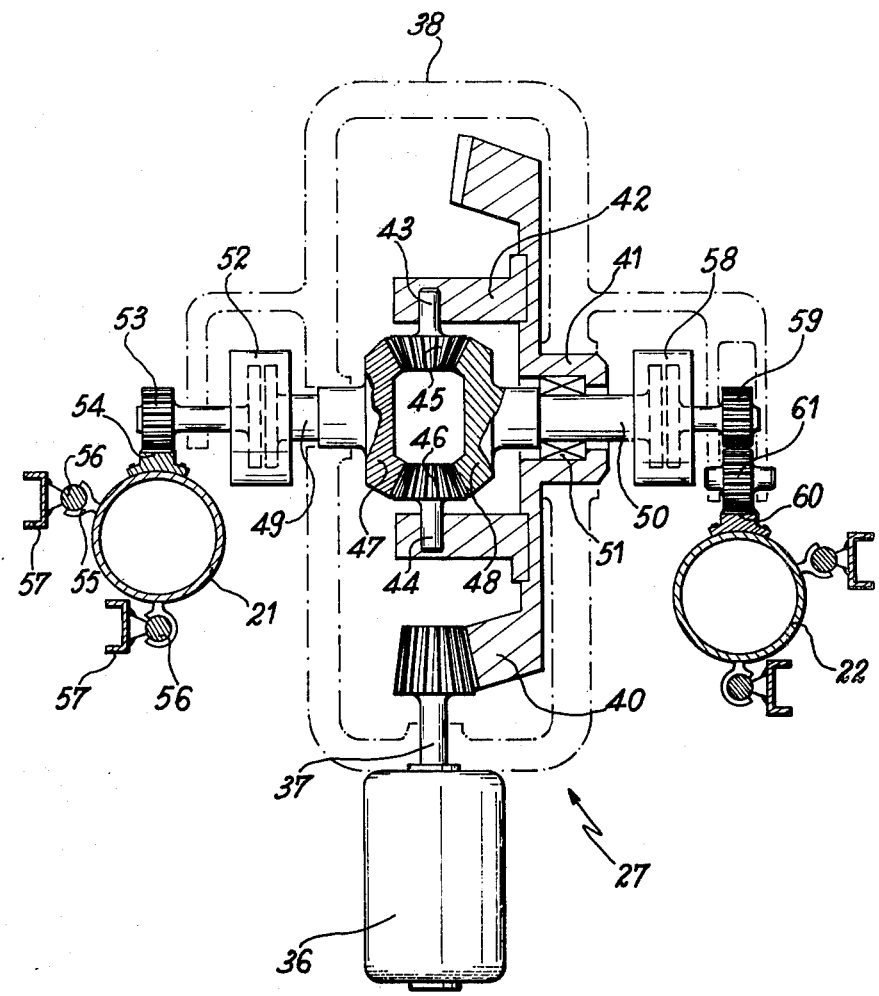
FIG. 2 is a transverse sectional view to a larger scale showing the differential drive system which is associated with the device shown in FIG. 1.

FIG. 2 illustrates to a larger scale the detail of the differential drive system which permits displacement of the arms 19 and 20 and especially of the vertical tubular portions 21 and 22 of these latter with respect to the support block 7 carried by the rotating plug 5. As can be seen from this figure, said system mainly comprises a single driving motor 36, the output shaft 37 of which is supported by a casing 38 which surrounds a conventional differential system. The end of the shaft 37 is fitted with a bevel pinion 39 disposed in meshing engagement with a driving ring-gear 40 provided axially with a hub 41 which is mounted to rotate freely within the casing 38. Said driving ring-gear 40 is rigidly fixed to a cylindrical sleeve 42 which is coaxial with the ring-gear and supports two transverse stub-shafts 43 and 44 respectively which are located in the line of extension of each other and provided with identical bevel pinions 45 and 46 mounted on the ends of said stub-shafts and constituting the planetary pinions of the differential. Said pinions engage with two further identical toothed rings 47 and 48 which constitute the sun-gears of the same differential, said two sun-gears being keyed on two output shafts 49 and 50 which are located in the line of extension of each other and rotatably mounted with respect to the casing 38 on bearings such as 51.

The shaft 49 is fitted with an electromechanical brake 52, the design function of which will be defined hereinafter, and is rigidly fixed at the opposite end thereof to a spur pinion 53 disposed in the example herein described in meshing engagement with a rack 54 carried by the external surface of the tubular portion 21 of the first arm. The movement of rotation of said pinion 53 determines a parallel translational movement of the arm 19 along its axis while guiding the tubular portion 21 by means of open forks such as the fork 55 which cooperate with stationary columns 56 carried by support brackets 57 mounted within the hood 26 which surrounds the complete mechanism. Similarly, the shaft 50 of the second toothed ring 48 is also fitted with a brake 58 and with a spur pinion 59 disposed in meshing engagement with a rack 60 carried by the external surface of the tubular portion 22 of the second arm 20. Transmission of motion of the pinion 59 to the rack 60 is carried out by means of an intermediate pinion 61 in such a manner as to reverse the direction of output motion of the shaft 50 and consequently the motion of the arm 20 with respect to the arm 19.

The operation of the handling device as hereinbefore described is as follows : the two arms 19 and 20 being mounted within the support block 7 and this latter being engaged within its hole 6 through the rotating plug 5 of the reactor vessel structure 3, the initial step consists in carrying out the positioning of the second arm 20 in order that the cylindrical guide tube 35 should be brought by this latter into position above the fuel assembly 2a to be handled by applying the lower extremity of said guide tube against the top face of the core 1, that is to say against the fuel assemblies 2 which surround the assembly 2a. To this end, the motor 36 is caused to rotate in the appropriate direction in such a manner that the output pinion 59 of the shaft 50 displaces the rack 60 and causes a downward movement of the tubular portion 22 of said arm until the guide tube 35 is abuttingly applied against the top face of the reactor core 1. During this movement, the brake 52 is controlled in such a manner as to lock the output shaft 49 of the sun-gear 47, thereby securing the drive pinion 53 against rotation. As can readily be understood, a suitable azimuthal positioning of the complete device has been carried out before initiating the downward movement of the arm 20 by combining the relative movements of rotation of the rotating plug 5 and of the support block 7.

Once this first operation has been completed, the brake 58 which locks the pinion 59 in position is actuated and the brake 52 is released in order that the pinion 53 may again be driven in rotation from the motor 36 so as to cause the cylindrical sleeve 32 which contains the grab 33 to move into the interior of the guide tube 35 until said grab engages over the head or upper extremity of the fuel assembly 2a to be handled.

The operation which consists in withdrawing the fuel assembly 2a can then be carried out by releasing both brakes 52 and 58 simultaneously and initiating the operation of the driving motor 36 in the appropriate direction. By means of the differential drive system, it is readily apparent that any tractive effort exerted on the fuel assembly 2a by the grab 33 by means of the tubular portion 21 of the first arm 19 is accompanied by an equal effort in the opposite direction on the tubular portion 22 of the second arm 20 which is applied by means of the guide tube 35 against the fuel assemblies which surround the assembly 2a. Since the two tubular portions 21 and 22 of the arms 19 and 20 are rigidly fixed to each other in the lateral direction by means of the stirrup-piece 28 and the rollers 29, the lateral reactions produced on the fuel assembly 2a on the one hand by the grab and on the other hand by the guide tube 35 are consequently always equal and in opposite directions or in other words cancel each other. Irrespective of the effort which is applied, the overall lateral reaction on the fuel assembly always remains zero. Accordingly, the effort exerted on the fuel assembly 2a by the grab 33 is solely axial and said assembly can readily be withdrawn to a sufficient height to permit disengagement from the guide tube 35, the other operations carried out on said assembly being conventional in themselves and being unrelated to the precise object of the invention.

The advantages of the device which has been described and illustrated arise from the explanations given in the foregoing and especially from the fact that the system proposed normally prevents any jamming of a fuel assembly even if this latter exhibits an appreciable degree of swelling or curvature. In fact, the operation of the two arms in synchronism and in opposite directions prevents any lateral reactions and makes it possible in principle either to withdraw or to place a fuel assembly in position except in the event of excessive deformation.

Moreover, by making use of brakes which produce action as required on either of the two output shafts of the differential drive system, the movements either of the grab or of the guide tube can be carried out independently. This arrangement makes it possible in particular to overcome some of the disadvantages which may be encountered during handling operations. In particular, when a fuel assembly becomes jammed at the mid-point of travel, for example as a result of excessive curvature, it is clearly possible by actuating the second arm alone to release the guide tube from the top of the fuel assembly and then to withdraw the complete device in order to leave room for carrying out the necessary remedial operations on the fuel assembly under consideration. Similarly, if any fuel assembly of the reactor core has undergone axial displacement with respect to adjacent assemblies and is located above the level of these latter, the guide tube can readily be passed over the top of said assembly, then lowered and caused to engage the assembly in accordance with the sequence of operations contemplated earlier, and finally to transport this latter in the same manner as the other core assemblies.

It is readily apparent that the invention is not limited in any sense to the example of construction which has been more especially described with reference to the accompanying drawings but extends to all alternative forms. In particular, the elements employed for motion transmission and connection between the tubular portions of the two arms and the output shafts of the differential system as constituted by rack and pinion assemblies in the example considered in the foregoing could also be replaced by sprocket-wheels carrying chains associated with the tubular portions of the arm at the upper ends thereof and passed over guide sprockets mounted in the hood which surrounds the differential system outside the reactor vessel structure.

What we claim is:

1. A device for handling fuel assemblies within the core of a nuclear reactor, said device being constituted by a group of fuel assemblies placed in adjacent relation in the vertical position and surrounded by a reactor containment vault or vessel structure which provides suitable protection against radiations, wherein said device comprises two arms having synchronized movements, the first arm being constituted by a vertical tubular portion, a right-angled horizontal support bracket fixed at the end of the tubular portion which penetrates into the reactor vessel structure and a vertical sleeve for guiding a handling grab which is provided at the opposite end of the support bracket with respect to the first arm, the second arm being provided with a vertical tubular portion, a right-angled horizontal support bracket disposed in the vertical plane containing the support bracket of the first arm, a vertical cylindrical guide tube which is coaxial with the guide sleeve of said grab, the tubular portions of the two arms being rigidly fixed to each other by means of a sliding coupling and endowed by means of a differential drive system with movements for producing the same effort but applied in the opposite direction in order that the lateral reaction of the grab of the first arm on a fuel assembly should be equal and opposite to the lateral reaction of the cylindrical guide tube of the second arm on the same fuel assembly, the differential system for actuating the two arms comprises a common driving motor for a driving ring-gear which carries two planetary pinionss disposed in meshing engagement with two sun-gears rigidly fixed to two driven output shafts which are disposed in the line of extension of each other and provided with two elements for direct motion transmission to the vertical tubular portions of the two arms.

2. A handling device according to claim 1, wherein the sliding coupling between the vertical tubular portion of the two arms is constituted by a transverse stirrup-piece which is rigidly fixed to one of the arms and carries rollers freely mounted on horizontal pins and applied against the surface of the other arm.

3. A handling device according to claim 1, wherein the output shafts of the two sun-gears are each associated with a brake which permits independent operation of either one arm or the other.

4. A handling device according to claim 1, wherein the elements for driving the tubular portions of the two arms are constituted by pinions engaged with racks carried by said tubular portions or by sprockets actuating chains which are connected to said tubular portions at the upper ends thereof.

\* \* \* \* \*